June 7, 1949. C. R. AVERY 2,472,560
GLASS FEEDER SHEAR MECHANISM ACTUATING MEANS
Filed Nov. 20, 1946
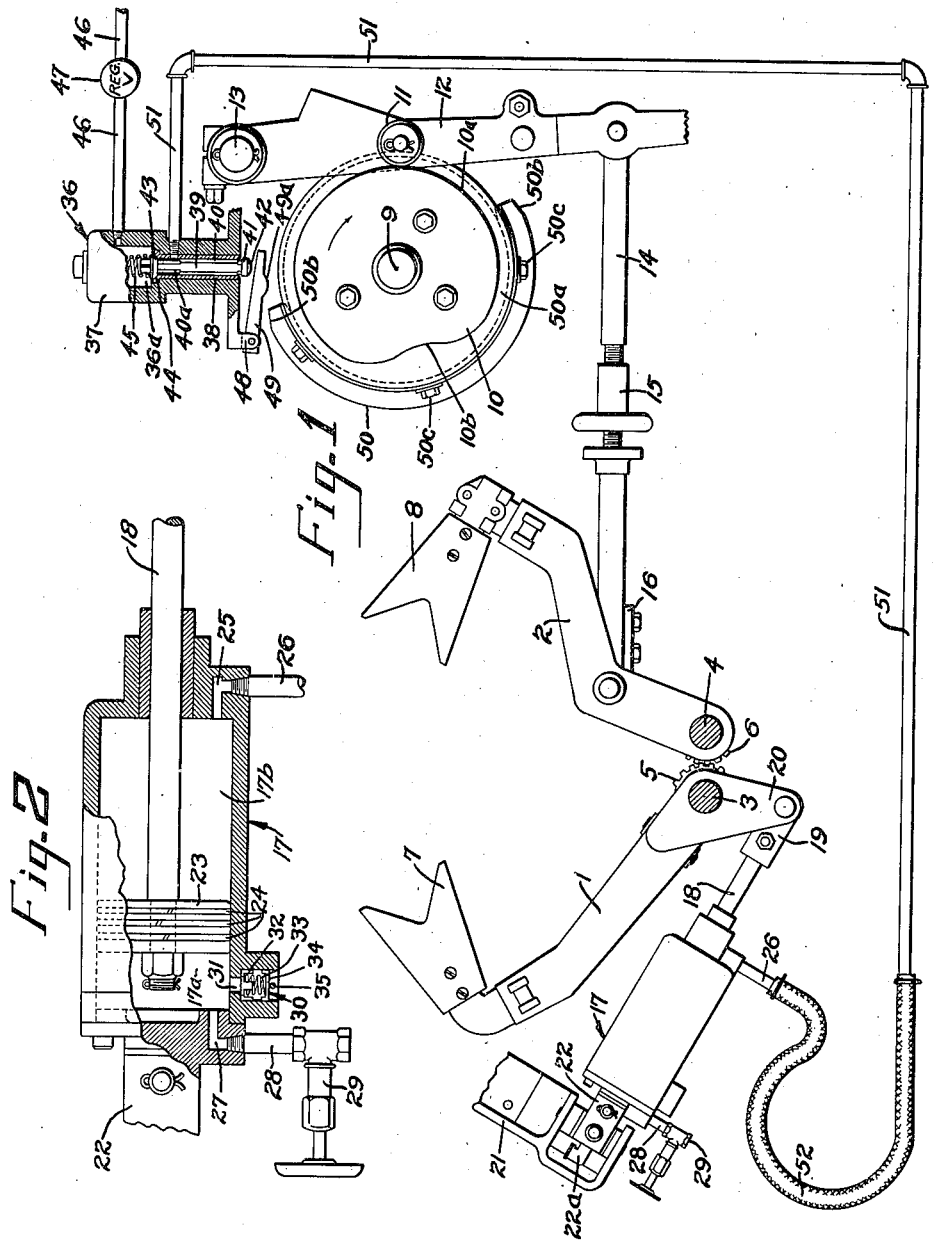
INVENTOR
CHARLES R. AVERY
BY Parham & Bater
ATTORNEYS Patented June 7, 1949

2,472,560

UNITED STATES PATENT OFFICE 2,472,560

GLASS FEEDER SHEAR MECHANISM
ACTUATING MEANS

Charles R. Avery, West Hartford, Conn., assignor
to Hartford-Empire Company, Hartford, Conn.,
a corporation of Delaware Application November 20, 1946, Serial No. 710,967

9 Claims. (Cl. 49—14)

This invention relates generally to improvements in means for actuating shear mechanisms for use in conjunction with glass feeders of the type used to form suspended molten glass mold charges. In suspended charge feeders, quantities of molten glass are periodically discharged at a controlled rate and in a preferred form from the lower portion of a spout section of a forehearth associated with a glass melting furnace. At predetermined times during the discharge of the molten glass from the spout, a shear mechanism is operated beneath the spout to sever individual charges or "gobs" from the pendent stream of discharging glass. These gobs may be directed thereafter to suitable molds in which the gobs may be fabricated into articles by any of a number of forming processes well known in the art.

One type of shear mechanism that has found widespread use in the art is disclosed in U. S. Patent No. 1,760,435 for a Shear mechanism for glass feeders, issued to Karl E. Peiler on May 27, 1930. In this type of shear mechanism, a pair of pivoted movable arms are swung with opposed synchronized motions in a horizontal plane beneath a discharge orifice of a forehearth spout. The arms carry shear blades that mutually contact immediately below the discharge orifice and coact to sever mold charges from the glass issuing from the orifice. As disclosed in the above mentioned patent, a pair of tension coil springs supply the forces that actuate the shear arms during the shearing stroke, the movements of the shear arms being controlled by a cam and linkage system. The present invention provides an improved means for and a novel method of actuating the blade-carrying arms of a shear mechanism of the general character disclosed by the Peiler Patent 1,760,435.

It is an object of this invention to provide shear mechanism actuating means capable of supplying a relatively constant force during the shearing stroke of the mechanism. It is also within the purview of this invention to provide means for easily regulating the magnitude of the force supplied by the actuating means over a wide range of values.

It is a further object of this invention to provide means for supplying a gradually increasing restraining force effectively to prevent a cam follower that is included in the shear mechanism actuating means from bouncing on an open working surface of a rotating actuating cam at any time in a cycle of operations of the shear mechanism.

It is a more specific object of this invention to provide means for easily regulating the magnitude and rate of increase of the restraining force.

A still further object of the present invention is the provision of a shear mechanism actuating means that may be operated so as to avoid undesirable variations in the torque that must be supplied to a cam shaft which imparts rotation to the shear mechanism actuating cam members.

A further object of the present invention is the provision of means for applying to the shear mechanism of a glass feeder actuating forces that may be easily varied in magnitude over a wide range and that may be applied and removed at predetermined times in the course of the feeder operation so as to minimize wear of the shear mechanism linkage system and undesirable surges therein.

Additional objects and advantages of the present invention will become apparent and be pointed out in the course of the following description which is made with particular reference to the accompanying drawings, in which:

Fig. 1 is a plan view of a glass feeder shear mechanism equipped with actuating means of the present invention, certain parts being rotated out of their true positions to afford a better view of their coaction and other parts being shown in section; and Fig. 2 shows to an enlarged scale a partial longitudinal section view of a novel pneumatic unit of the improved actuating means.

As viewed in Fig. 1, left and right-hand shear arms 1 and 2, respectively, are pivoted about vertical pivot pins 3 and 4, respectively. Adjustably secured to shear arms 1 and 2 are gear segments 5 and 6, respectively. These gear segments are in mesh and constrain the shear arms to swing in synchronized opposed motions in response to actuating forces which will be described hereinafter. Releasably secured to arm 1 is a shear blade 7. Shear blade 8 is adjustably secured to arm 2. Shear blades 7 and 8 coact during the closing or shearing stroke of the shear arms to sever a discharging glass stream issuing from a forehearth spout (not shown).

Control of the movements of the shear arms is derived from the continuous rotation of camshaft 9. The shaft is rotated at a proper speed relative to other parts of the glass feeder mechanism. Bolted to a flange on shaft 9 is a disc type shear cam 10. A cam roller 11 bears in guided relationship on the periphery of cam 10 and is pivotally secured to an oscillatory lever 12. Lever 12 may swing in a vertical plane about a permanently mounted pivot pin 13. An adjustable connecting link 14 is attached at one end to the lower portion of lever 12. A turnbuckle 15 is intermediately disposed in link 14 and permits a ready adjustment of the longitudinal extent of the connecting link. The opposite end of link 14 is connected to shear arm 2 by a pivotal attachment, such as a universal joint 16.

It will be apparent to those skilled in the art that additional forces must be applied to the hereinbefore described mechanism in order to assure continuous contact of cam roller 11 on the contour of cam 10. In the shear mechanism disclosed in the Peiler patent, these forces were supplied by a pair of tension coil springs. In the present invention, forces of a predetermined magnitude may be applied periodically to the shear mechanism by a fluid pressure device. In the present embodiment of the invention, this fluid pressure device is shown in the form of a cylinder and piston mechanism. A cylinder, generally designated 17, has a piston rod 18 extending outwardly therefrom and connected to shear arm 1 by means of a universal joint 19. The universal joint is attached to an ear 20 projecting outwardly from the pivoted end of shear arm 1. One end of the cylinder is attached to a portion 21 of the permanent structure of a glass feeder by means of a universal type joint 22. An oil cup 22a may be provided to supply lubrication to universal joint 22.

Shown in longitudinal section in Fig. 2 are the details of the fluid pressure actuating device. The cylinder 17 has a reciprocable piston 23 movably disposed in its bore. Piston 23 divides cylinder 17 into left and right-hand portions 17a and 17b, respectively. Piston 23 has piston rings 24 of a standard conventional variety. A passage 25 communicates between pipe nipple 26 and portion 17b of the cylinder. Another flow passage 27 communicates between pipe nipple 28 and portion 17a of cylinder 17. Nipple 28 is connected to needle or throttle valve 29. A check valve, generally designated 30, permits the egress of fluid from portion 17a of the cylinder. Check valve 30 consists of a valve disc 32 of sufficient size to cover hole 31 which communicates with portion 17a of the cylinder. Valve disc 32 is spring loaded by a coil spring 33. Coil spring 33 is maintained in position by a perforated support plate 34, the support plate being maintained in position by a fixed pin 35 mounted in a wall portion of the cylinder. When a fluid pressure of sufficient magnitude is present in portion 17a of cylinder 17, spring 33 will be compressed by the fluid pressure acting on the face of valve disc 32, the compression of the spring permitting the movement of valve disc 32 and the ensuing exhaust of the pressurized fluid from portion 17a of the cylinder to the atmosphere.

The flow of pressurized fluid to the cylinder and piston mechanism above described is regulated by a trip valve, generally designated 36 (Fig. 1). Trip valve 36 is composed of a valve housing 37, housing 37 carrying a valve guide 38. Slideably disposed for axial movements in guide 38 is a tappet valve member 39. Valve member 39 is formed to define a pair of longitudinal grooves 40, the grooves communicating with a clearance space 40a at the upper portion of the valve member. Valve member 39 is further formed to define a cylindrical face 41 in its lower portion. A button end 42 is formed on the lower end of the valve member. A conical face 43 is provided at the upper end portion of the valve member. Conical face 43 of the valve cooperates with the conical face 44 of the valve guide to form an openable and closable tappet-type valve in a manner well known to the art. A valve spring 45 bears on the upper end of valve member 39 and tends to hold conical face 43 against the cooperating conical face of the valve guide.

An inlet pipe line 46, having an adjustable regulating valve 47 disposed therein, may be used to introduce pressurized fluid, such as compressed air, to an inclosed space 36a above valve member 39. The flow of this pressurized fluid to the cylinder and piston mechanism hereinbefore described is controlled by the movements of valve member 39, as will be described presently. Projecting from a lower portion of the valve housing is ear 48. Pivotally attached thereto for limited swinging movements is a valve lever 49. Lever 49 cooperates with cam track 50; which is adjustably secured to a peripheral portion of a cylindrical disc 50a attached to shaft 9, to impart controlled movements to member 39. As cam track 50 is rotated by the rotation of disc 50a by cam shaft 9, the cam track will come into bearing relationship with projection 49a of lever 49. Lever 49 is of sufficient extent to bear on button end 42 of valve member 39. As valve lever 49 is swung upwardly, it will come into bearing relationship with the button end of the valve member and thereafter raise the valve member, lifting conical face 43 off of conical face 44 of the valve guide. While in this position, pressurized fluid may flow from space 36a, past the conical face of the valve member to clearance space 40a and thence to a transfer pipe line 51. A flexible connecting member 52 is provided to convey pressurized fluid from pipe line 51 to pipe nipple 26 which is secured in the cylinder housing. The flexibility of connector 52 will permit the necessary movements of the cylinder-piston mechanism without leakage of fluid.

For a complete understanding of the operation and advantages of the herein disclosed mechanism, the relationship of the shear cam 10 to cam track 50 should be carefully noted. It is to be observed that cam track 10 has a portion of relatively constant radius for a considerable angular extent that is slightly in excess of 180°. This portion of the cam track has been designated 10a for convenience. This constant rise portion of the cam is joined by a continuous curvature to a minimum point 10b. It is also to be observed that cam track 50 has a relatively constant radius or rise for almost its entire angular extent and that the ends of the cam track are tapered or bevelled as at 50b, so as to gradually impart raising and lowering movements to valve lever 49. Bearing in mind the clockwise direction of rotation of camshaft 9 indicated in Fig. 1, it is to be noted that trip valve 36 is forced open to admit the flow of pressurized fluid to cylinder 17 at the time cam roller 11 is at about the mid-point of the relatively constant rise section 10a of cam 10. At this time, the shear arms 1 and 2 will be completely retracted and in position to begin a shearing stroke. As camshaft 9 continues to rotate, trip valve 36 will be held open by cam track 50 and cam roller 11 will gradually ride to the minimum point 10b of cam 10. The pressurized fluid, passed by trip valve 36 and introduced into portion 17b of cylinder 17 by flow passage 25, will produce a tension force or pull on piston rod 18 tending to close the shear arms and constraining cam roller 11 to follow the contour of cam 10 to the minimum point 10b. Thus, it is the pressurized fluid in portion 17b of the cylinder that actually does the work of closing the shear blades to sever glass charges and also provides the necessary forces to constrain the cam roller to follow the contour of cam 10. During the movement of piston 23 to the left, as viewed in Fig. 2, fluid will be exhausted from portion 17a of the cylinder to the atmosphere through check valve 30.

Immediately after cam roller 11 leaves minimum point 10b of cam 10, valve lever 49 will ride off the end of cam track 50 thereby permitting the lowering of valve member 39 under the action of valve spring 45. The lowering of the valve member causes a sealing or seating action between conical faces 43 and 44, thereby cutting off flow of pressurized fluid to the cylinder. Valve member 39 in its lowermost seated position permits communication of grooves 40 with the atmosphere. The pressurized fluid in portion 17b of the cylinder can thus flow through pipes 26 and 51 to grooves 40 and thence to the atmosphere, thus, in effect, exhausting portion 17b of the cylinder of atmospheric pressure. This exhausting action is prevented during the pressurization of the cylinder by cylindrical face 41 which is moved into guide 38 by the raising of valve member 39, thus forming a seal prohibiting exhausting of fluid through grooves 40 to the atmosphere.

As camshaft 9 continues to rotate, cam roller 11 will be moved outwardly towards the constant rise portion 10a of cam 10. The acceleration of cam roller 11 and its associated parts is opposed by a gradually increasing force or dashpot effect caused by the gradual evacuation of portion 17a of cylinder 17 as piston 23 is moved toward the right in portion 17a. This evacuation gradually increases in magnitude at a non-linear rate relative to the piston movement and is of sufficient magnitude to prevent the cam roller from bouncing or being thrown from the contour of cam 10 by inertia forces of the parts resulting from the velocity imparted thereto by cam 10. Such a bouncing of the cam roller will cause undesirable surges in the linkage system. The magnitude of the vacuum can be regulated by the size of the flow passage through needle or throttle valve 29. This can be adjusted at will to suit the conditions of operation of the shear mechanism. After cam roller 11 has reached the constant rise section of cam 10, air will gradually enter portion 17a of the cylinder through needle valve 29, gradually reducing the vacuum to zero (that is, raising the pressure in portion 17a to atmospheric pressure).

Cam track 50 may be secured to disc 50a by means of bolts 50c. Slots may be provided in the cam track through which bolts 50c may pass to permit adjustments of the angular position of cam track 50. Such angular adjustments facilitate the ideal positioning of the point of fluid pressure cut-off relative to the shear cam position.

Thus, in summary, all movements of the shear arms are controlled by the contour of cam 10. The actual energy for the shearing of glass by the mechanism and the actual energy to swing arms 1 and 2 together is supplied pneumatically by the fluid pressures acting in portion 17b of the cylinder. As soon as this relatively large pneumatic force in cylinder 17 is no longer required, it may be removed from the system by the exhausting of the pressurized fluid to the atmosphere through grooves 40 of valve member 39. During the return stroke of the shear arms, a gradually increasing restraining force is applied to the shear arms by means of the gradually increasing vacuum formed in portion 17a of cylinder 17 by the return movement of piston 23. The magnitude of the vacuum or pressure differences across piston 23 set up by the vacuum is sufficient to prohibit surging in the linkage system or bouncing of the cam roller on cam 10 due to inertia forces therein.

A particular advantage of this invention is the fact that no restraining forces of a relatively large magnitude are present in the system during the acceleration of the mechanism by the increasing rise of cam 10 between minimum point 10b and constant rise section 10a. Elimination of these forces, of course, reduces wear of the moving parts in the system and also permits a more uniform torque of shaft 9. A relatively uniform torque of shaft 9 is desirable in the operation of the feeder of which shaft 9 is a part.

By suitable adjustment of regulating valve 47, the magnitude of the pressurized fluid forces acting in portion 17b of cylinder 17 can be regulated at will.

Many modifications of this invention will occur to those skilled in the art after reading the above disclosure. It is desired, however, that the scope of this invention be limited only by the scope of the hereinafter appended claims and that the invention be not restricted to the details of construction of the herein described preferred embodiment.

I claim:

1. In combination with a shear mechanism for a glass feeder, actuating means for operating said shear mechanism comprising a fluid pressure cylinder, a reciprocable piston operatively disposed therein, means to feed pressurized fluid to one side of said piston at predetermined times and to release fluid therefrom at other predetermined times, regulable means to gradually admit fluid to the other side of said piston, normally closed valve means operatively connected to said cylinder and constructed and arranged to open under a predetermined fluid pressure within the cylinder at said second named side of the piston to exhaust fluid therefrom, and means to operatively connect said piston to said shear mechanism.

2. In combination with a shear mechanism for a glass feeder, actuating means for operating said shear mechanism comprising a fluid pressure cylinder and piston mechanism, means to regulate the flow of pressurized fluid thereto and therefrom at predetermined times, means to cause a partial vacuum within one end of said cylinder during the movement of said piston away from said end of said cylinder, and means to operatively connect said piston to said shear mechanism.

3. Apparatus as defined in claim 1 wherein said normally closed valve means comprises a spring loaded check valve.

4. Apparatus as defined in claim 1 wherein said means to gradually admit fluid to said cylinder comprises a hard operated needle valve.

5. In combination in a glass feeder shear mechanism, a pair of coacting pivoted movable shear arms, means operatively connecting said shear arms together to cause them to open and close in unison when either is moved operatively, shear blades secured thereto, a cam operated linkage system operatively associated with said shear arms, a fluid pressure cylinder pivotally secured for swinging movements to a stationary portion of said glass feeder, a reciprocable piston movably disposed in said cylinder, means to feed pressurized fluid to one side of said piston at predetermined times and to release fluid therefrom at other predetermined times, a regulable means to gradually admit fluid to the other side of said piston, a check valve to exhaust fluid from said second mentioned side of said piston during application of pressurized fluid to the first mentioned side thereof, and means pivotally connecting said piston to one of said shear arms.

6. In a shear mechanism for glass feeders, a pair of openable and closable shear blades, means connecting said shear blades together to cause them to move in unison in opposite directions when movement is imparted in either of them, a pivoted lever and rigid linkage operatively connecting said lever to one of said shear blades, a cam follower carried by said lever, an open rotary cam in working contact with said follower and formed to move the latter and the connected lever and linkage to open the shear blades when said cam is rotated, means to rotate said cam, and a pneumatic device operatively connected to said shear blades to effect closing movements thereof in alternation with their opening movements by the cam-actuated mechanism and to cause a gradually increased damping of the movements of the cam-actuated mechanism during the operation thereof to open said blades.

7. Apparatus as defined in claim 5 wherein said cam operated linkage system comprises a continuously rotating cam, a pivoted lever periodically oscillated thereby, and an adjustable link pivotally connecting said lever to the second of said shear arms.

8. Apparatus as defined in claim 5 wherein said means to feed pressurized fluid to and release said fluid from said fluid pressure cylinder comprises a cam actuated, spring loaded tappet valve.

9. Apparatus as defined in claim 1 and, in addition, an adjustable regulating valve associated with said means to feed pressurized fluid to said cylinder, said regulating valve maintaining a predetermined fluid pressure at said fluid feed means.

CHARLES R. AVERY.

REFERENCES CITED

The following references are of record in the file of this patent:

UNITED STATES PATENTS

| Number | Name | Date |
| --- | --- | --- |
| 1,760,435 | Peiler | May 27, 1930 |
| 1,885,302 | Slick | Nov. 1, 1932 |
| 1,976,239 | Lorenz et al. | Oct. 9, 1934 |